United States Patent

[11] 3,539,144

[72] Inventor Hans-Dietrich Krug
 Heidelberg, Germany
[21] Appl. No. 575,507
[22] Filed Aug. 29, 1966
[45] Patented Nov. 10, 1970
[73] Assignee Carl Freudenberg, Kommanditgesellschaft
 Weinheim an der Bergstrasse, Germany
 a corporation of Germany
[32] Priority Sept. 4, 1965
[33] Germany
[31] F 47,0913

[54] MOLD FOR MOLDING POLYURETHANE FOAM ARTICLES
 4 Claims, 4 Drawing Figs.
[52] U.S. Cl. .................................................. 249/114;
 117/5.1, 117/77; 18/47; 249/134
[51] Int. Cl. .................................................. B28d 7/36
[50] Field of Search ....................................... 249/134,
 114; 264/337, 338; 117/77, 75, 72, 161(ZA), 5.1,
 5.3; 18/34(m), 47(c)

[56] References Cited
UNITED STATES PATENTS
2,720,004 10/1955 Phreaner ..................... 264/337
3,251,909 5/1966 Pickands et al. ............. 264/338X
3,318,717 5/1967 Simpson ...................... 117/72X
3,366,514 1/1968 Chadha et al. ............... 117/75X Primary Examiner—J. Spencer Overholser
Attorney—Burgess, Dinklage and Sprung ABSTRACT: A mold useful for producing polyurethane foam articles having a foam form interior and a substantially non-foam form surface integral with the foam form interior which mold comprises a structural mold shape, a coating of hot vulcanizate silicon rubber disposed on the structural mold, and a cold vulcanizate silicon rubber deposited on the hot vulcanizate silicon rubber on the side thereof directed away from the structural mold and directed toward the polyurethane material being molded in such mold.

Patented Nov. 10, 1970 3,539,144

INVENTOR
HANS-DIETRICH KRUG
BY
ATTORNEYS.

MOLD FOR MOLDING POLYURETHANE FOAM ARTICLES

This invention relates to foamed articles. It more particularly refers to a process for the production of polyurethane foam articles having a protective coating thereon.

The manufacture of polyurethane materials is quite well known. These materials are the reaction and polymerization products of isocyanato- or isothiocyanato-containing compounds and compounds containing active hydrogen such as acids, alcohols, amides, etc. It is well known to utilize both aromatic and aliphatic diisocyanates and diisothiocyanates, such as for example tolylene diisocyanate and hexomethylene diisothiocyanates, in the production of these polymers. Suitable, known active hydrogen-containing compounds used to make polyurethanes are polyesters and polyethers, as exemplified by polyethylene adipate and polypropylene oxide, which polyester may be either carboxyl- or hydroxyl-terminated, as desired.

It is known to produce foamed articles comprising polyurethane by providing the polymerization reaction mixture with a blowing agent of some sort. It has been found to be quite desirable in many cases to provide foamed polyurethane articles with a protective layer which is relatively nonfoam in structure.

Production of this type of article has in the past been accomplished in a two-step process. The foam article of desired shape and size has been produced and a suitable protective skin of appropriate size and shape has been produced. These two parts have then been joined by gluing or other suitable means to form the desired final article. It has also been proposed to produce a protective layer or skin in the form of a pouch and then to produce the polyurethane foam inside the pouch whereby the desired composite article is produced.

As can be seen, prior art methods have generally required two articles to be separately produced and then joined together to form the desired end product. It will be appreciated that this type of production is in need of improvement since it would be desirable to carry out the production of the desired articles discussed above by a less cumbersome process.

It is therefore an object of this invention to provide a novel process for the production of articles of polyurethane foam having a protective layer thereon.

It is another object of this invention to provide an article structually consisting essentially of a polyurethane having a foamed interior and a substantially nonfoam exterior.

It is a further object of this invention to provide a novel apparatus in which an article as described above can be produced.

Other and additional objects of this invention will become apparent from a consideration of this entire specification including the claims and the drawings appended hereto.

In accord with and fulfilling these objects, this invention includes as one of its aspects a shaped article structurally consisting essentially of a polyurethane and having an integral foamed interior and substantially nonfoam exterior.

An excellent process for the production of such desired shaped foam form articles has been disclosed and claimed in U.S. application Ser. No. 566,009, filed July 18, 1966, in the name of the instant inventor. It has now been discovered that the process therein described can be practiced to produce a special, even more desirable product by providing a mold of novel construction in which the process is carried out. It has been discovered that so-called "cold vulcanizate" silicone rubber has the ability to induce a polyurethane foam formed in a mold having inside walls of such silicone rubber to form with a thick nonfoam surface thereon.

Thus, it is practical to provide a suitable shaped mold of substantially any desired material and to provide as a coating on the inside wall a cold vulcanizate silicone rubber. Alternatively, the entire mold may be constructed of cold vulcanizate silicone rubber.

The cold vulcanizate silicone rubber is also described in the literature as RTV silicone rubber. The abbreviation RTV stands for Room Temperature Vulcanizing.

Both, the cold vulcanizate and the hot vulcanizate silicone rubber are polymerized di-methyl-siloxane. The molecular weight of the hot vulcanizate silicone rubber is always over 500,000 whereas the molecular weight of the cold vulcanizate silicone rubber is much lower, namely 10,000 to 100,000.

The difference in the molecular weights is caused by different polymerization catalysts. If one adds e.g. a peroxide to the di-methyl-siloxane, then the temperature must be raised above 100° C in order to induce a polymerization or crosslinking, because only above that temperature the peroxide decomposes to form radicals which bring the crosslinking of the siloxane chains. Thereby the elevated temperature sponsors the formation of long chains.

However, if one adds an organo-tin-compound e.g. di-butyl-tin-di-laurate to the di-methyl-siloxane this relatively low polymerization starts at room temperature. This relatively low temperature sponsors the formation of shorter chains. For this reason, the degree of polymerization and hence the molecular weight of the cold vulcanizate silicone rubber is lower than the molecular weight of the hot vulcanizate silicone rubber. Due to these differences in the degree of polymerization, both silicone rubber types also differ in their mechanical properties. Thus, the highly polymerized hot vulcanizate silicone rubber has a better tensile strength than the cold vulcanizate rubber.

The "hot vulcanizate" silicone rubber is described in "Kunststoffe" (1957) No. 8, pages 431 to 434.

The "cold vulcanizate" silicone rubber is described in "Encyclopadie der technischen Chemie" by Ullmann, vol. 15 (1964), page 787. According to this invention, this process can be conducted to produce a product having an exceptionally thick nonfoam skin if the special "cold vulcanizate" silicone rubber is used as the mold inner surface and if the mold has a subsurface of hot vulcanizate silicone rubber materials. It has been found that, while cold vulcanizate silicone rubber induces the formation of an especially thick nonfoam skin on polyurethane foam articles, the cold vulcanizate silicone rubber is not a particularly satisfactory construction material since its tensile strength is significantly less than would be desired. Thus, while excellent products are produced in molds of cold vulcanizate silicone rubber alone or reinforced with some structural material, it has been found that it would be desirable to provide a mold which would have a longer effective life.

In accord with this aspect of the instant invention then, a preferred mold is formed from a two-layer structure as the inner wall thereof. The "cold vulcanizate" silicone rubber is the ply of this structure closest to the mold cavity, while the backing ply of this structure is the more conventional "hot vulcanizate" silicone rubber. This two-ply structure has been found to give excellent results in inducing the formation of polyurethane foam articles having a thick substantially nonfoam surface skin thereon. Further, it has been found that this two-ply structure has excellent total tensile strength and is exceptionally capable of withstanding repeated use without marked deterioration or delamination.

In some instances, it may be desired to produce a polyurethane foam article having a nonuniformly thick nonfoam outer surface. This type of article can be produced by utilizing a mold having an inner wall of hot vulcanizate silicone rubber upon portions of the inner surface of which there has been applied a layer of "cold vulcanizate" silicone rubber corresponding to those portions of the surface of the foam-form article being molded which are intended to have a thicker substantially nonfoam skin.

In any of the aspects of this invention, it has been found practical to use a reinforced mold. That is, while it is possible to use merely a silicone rubber composite structure mold, it has been found to be better to use a silicone rubber mold surface according to this invention which is disposed inside or coated on a structural material, e.g., steel, of the desired shape.

Understanding of this invention will be facilitated by reference to the accompanying drawings, in which.

Figure 1:
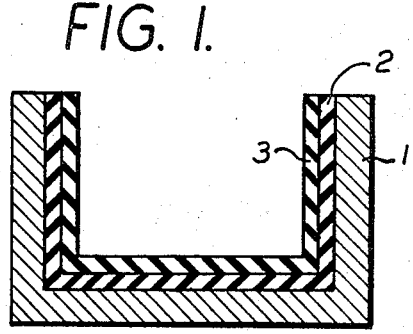
FIG. 1 is a sectioned front elevation of a reinforced mold according to this invention.

Although the drawing of the subject application depicts specific shaped molds and molded articles, the specific geometric configuration of either the mold or the molded article is immaterial to this invention and forms no part thereof.

Referring now to these drawings, and particularly to FIG. 1 thereof, a mold structure 1 is provided with a first inner layer of hot vulcanizate silicone rubber 2 and this hot vulcanizate silicone rubber 2 is then coated with an innermost layer of cold vulcanizate silicone rubber 3.

Figure 2:
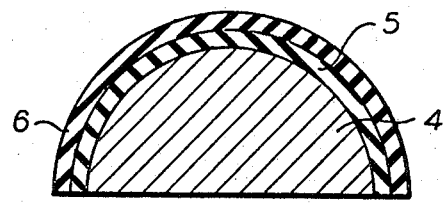
FIG. 2 is a sectioned front elevation of a mold inner wall formed on a model.

In FIG. 2, there are shown the results of producing a suitable shaped mold from a model 4 of the foam-form article to be produced. This model 4 has applied thereto a first layer of cold vulcanizate silicon rubber 5 and a second layer applied over the cold vulcanizate 5, of hot vulcanizate silicone rubber 6.

Figure 3:
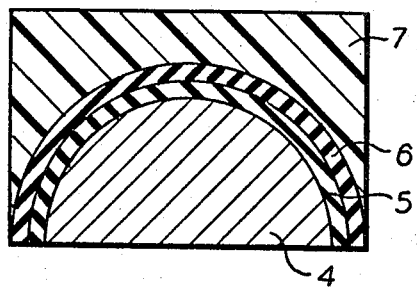
FIG. 3 is the same as FIG. 2, having an additional support shown.

In FIG. 3, there is shown the same model 4 and mold inner surface 5 and 6, but, in addition, a reinforcing resin 7 has been applied over the hot vulcanized silicone rubber 6.

Figure 4:
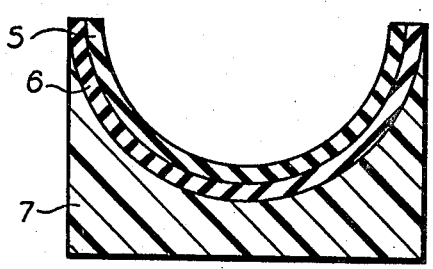
FIG. 4 is the same as FIG. 3 with the model removed.

In FIG. 4, there is shown the mold of FIG. 3 with the model removed therefrom preparatory to use of the mold for making foam-form article which will duplicate the model.

The cold vulcanizate silicone rubber is suitable provided in the proper shape by coating it onto a structural support or by casting it into the proper shape.

The hot vulcanizate silicone rubber is suitable hardened in situ after it has been properly positioned by incorporating a peroxide into it and heating to about 190° C.

Each silicone rubber, or just the cold vulcanizate silicone rubber, can be provided in any desired thickness. It is preferred to use silicone rubber layers of at least 1 mm. thickness. According to this invention, the foam-form article produced has a substantially nonfoam surface about 0.5 mm. thick, as compared to a substantially nonfoam surface up to about 0.05 mm. thick where no silicone rubber is provided as the inner surface of the mold.

The process of producing a foam-form article according to this invention is substantially the same as that described in the aforementioned patent application. This process consists of introducing polyurethane foam-forming composition into the mold; closing the mold; and permitting foaming to take place in the conventional manner. It is most desirable that the foam exerts pressure on the interior walls of the mold during formation thereof, suitably up to about 100 atmospheres.

Conventional polyurethane foam-forming materials are used, e.g., an active hydrogen-containing compound such as a polyether or a polyester prepolymer and a polyisocyanato-terminated compound or polymer coupled with a blowing agent of some sort. A preferred active hydrogen-containing compound is Desmophen 3900 by Farbenfabriken Bayer. Tolylene diisocyanate is the preferred isocyanato-terminated compound. The mol proportion of polyurethane forming reactants is about equal mol ratios of each with either being permitted in slight excess. It is preferred to provide no greater than 5 percent water in the polymer-forming reactant mixture.

I claim:

1. A mold adapted to use to produce a polyurethane foam-form article having a substantially foam-form interior and a substantially non-foam-form surface integral with said interior which mold comprises a mold structure, a first inner layer of hot vulcanizate silicon rubber on the inner surface of said mold structure, and a cold vulcanizate silicon rubber deposited on the inner surface of said hot vulcanizate silicon rubber.

2. A mold as claimed in claim 1, wherein said silicone rubber is provided with a structural support.

3. A mold as claimed in claim 1, wherein said hot vulcanizate silicone rubber is coated on a structural support.

4. A mold as claimed in claim 1, wherein said hot vulcanizate silicone rubber is partially coated with cold vulcanizate rubber.